United States Patent [19]
Stepanek

[11] Patent Number: 5,662,986
[45] Date of Patent: Sep. 2, 1997

[54] HOLOGRAPHICALLY TRANSFERABLE IMAGES

[75] Inventor: Michael J. Stepanek, Hollis, N.H.

[73] Assignee: Hampshire Holographic Manufacturing, Corp., Milford, N.H.

[21] Appl. No.: 679,347

[22] Filed: Jul. 9, 1996

[51] Int. Cl.$^6$ .................................................. B32B 3/00
[52] U.S. Cl. .................... 428/195; 428/174; 428/221; 428/332; 428/488.4; 428/537.5; 428/913; 428/914; 156/247
[58] Field of Search ................... 427/195; 428/411.1, 428/195, 913, 914, 186.4, 174, 221, 332, 488.4, 537.5; 156/247

[56] References Cited

U.S. PATENT DOCUMENTS 5,155,604 10/1992 Miekka et al. ................ 359/2
5,248,544 9/1993 Kaule .......................... 428/195

*Primary Examiner*—William Krynski
*Attorney, Agent, or Firm*—Stephen W. White

[57] ABSTRACT

This invention relates to holographic images formed by a unique process for various security and decorative purposes. Also, this invention relates to aluminized roll-stock holographic images formed on a plastic layer. Further, this invention relates to elements and process for transferring holographic images to yet another substrate. The invention relates to a unique process for transferring holographic images to a relatively inexpensive substrate which permits a wide-spread use of the holographic image.

7 Claims, 2 Drawing Sheets

HOLOGRAPHICALLY TRANSFERABLE IMAGES

BACKGROUND OF THE INVENTION

1. Field of the Invention

This invention relates to holographic images formed by a unique process for various security and decorative purposes. Also, this invention relates to aluminized roll-stock holographic images formed on a plastic layer. Further, this invention relates to elements and process for transferring holographic images to yet another substrate. Still further, this invention relates to a unique process for transferring holographic images to a relatively inexpensive substrate which permits a wide-spread use of said holographic image.

2. Description of the Prior Art

Holographically enhanced materials are well known in the prior art. These are usually made by very proprietary methods which includes passing a layer of plastic, for example, through a machine which imparts a variation (e.g. which can be an image itself) within covering or upper strata of the plastic layer. This step is somewhat similar to, but not exactly the same, as embossing. A powdered metallic element (e.g. aluminum) is then applied thereon by the so-called metallizing process. After this step, the element appears to have a holographic or 3-dimensional image imparted on the layer of plastic. This image is extremely pleasing and is widely used within the credit card and security industries, for example, to impart an image particular to that credit card or security element thereon. The resulting image is difficult to duplicate and thus these elements assist in the prevention of fraud by counterfeiting, for example. The draw-back to the use of these images is the cost since the machines to produce the image are complicated and costly in and of themselves. Additionally, holographic elements produced by this method (the so-called "shim" method) are usually small in size and thus cannot be imprinted with larger images. Thus, this material has not been widely used outside of the credit card and novelty industry.

Within the food packaging industry it is known use foils and the like for the wrapping of individual food pieces, for example. Sometimes, these foils are embossed with decorative or advertising logos and materials. In addition, it is known in this industry to laminate with glues metallized materials to tissue like paper tissues for the wrapping of individual food pieces such as candies, gums and the like, for example.

Recently, a process for making large sheets of holographically enhanced material has been developed. Thus, the costs of such holographically enhanced material have been significantly reduced. However, these large sheets of material are usually placed on a plastic surface which is also rather expensive and thus the use of this material is still rather limited. If the holographic image could be further transferred to yet another substrate, one which was less expensive and one which had higher utility (e.g. thin paper tissues), the use of holographically prepared images would find wider use in decorative wrappings and in advertising, for example.

SUMMARY OF THE INVENTION

It is an object of this invention to provide a holographic image that can be transferred to another substrate. It is a further object to utilize a unique transferring process that can place a holographic image directly on a cheaper paper tissue substrate such as a tissue-like paper tissue, for example. These and yet other objects are achieve in a thin, paper tissue containing wrapping element, said wrapping element having a holographic image having imparted thereto by laminating to said thin paper tissue a holographic image on a polymeric substrate under elevated temperatures and pressure and subsequently delaminating said paper tissue substrate from said polymeric substrate.

In yet another embodiment, this invention may be achieved in a process for transferring a holographic image to a paper tissue substrate by laminating a holographic image, said image having been imparted on a polymeric substrate, to said paper tissue substrate at a temperature greater than 25° C. and a pressure greater than 1 pound per square inch and subsequently delaminating said paper tissue substrate from said polymeric substrate, whereby said holographic image is transferred to said paper tissue substrate.

DETAILS OF THE INVENTION

Figure 1:
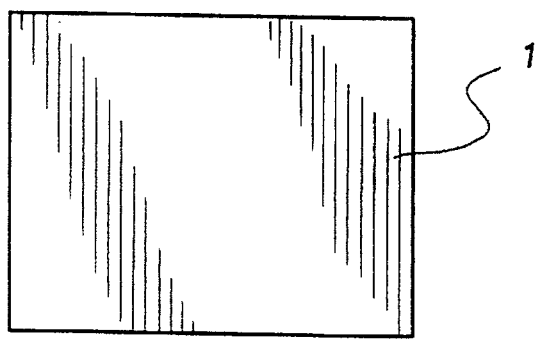
FIG. 1 is a top view of an actual prior art holographic image prepared by the process described above and contained on a polymeric substrate.

Looking now specifically at the drawings which schematically show the holographic image which is transferable from a polymeric substrate to a more useable paper tissue substrate, FIG. 1 is a top view of an actual holographic image 1 contained on a polymeric substrate. The image has that 3-D holographic look that is well-known in the prior art, especially in the security art field.

Figure 2:
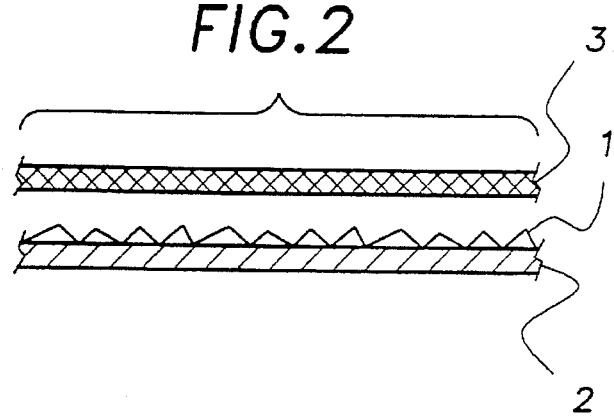
FIG. 2 is a drawing of a side view of FIG. 1. A paper tissue substrate is shown directly above the holographic image which is contained on a polymeric substrate in this Figure.

In FIG. 2, a side view drawing of the holographic image 1 from FIG. 2 is shown. In this figure, the polymeric substrate on which the holographic image is manufactured, is shown as 2. A paper tissue substrate 3 is shown located directly above the image.

Figure 3:
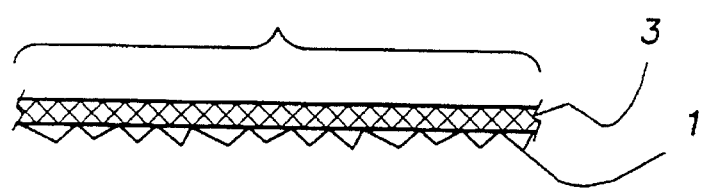
FIG. 3 is a drawing of a side view of a holographic image that has been transferred from the element of FIG. 1 directly to the paper tissue substrate of FIG. 2

In FIG. 3, the holographic image 1 has been transferred to the paper tissue substrate 3.

Figure 4:
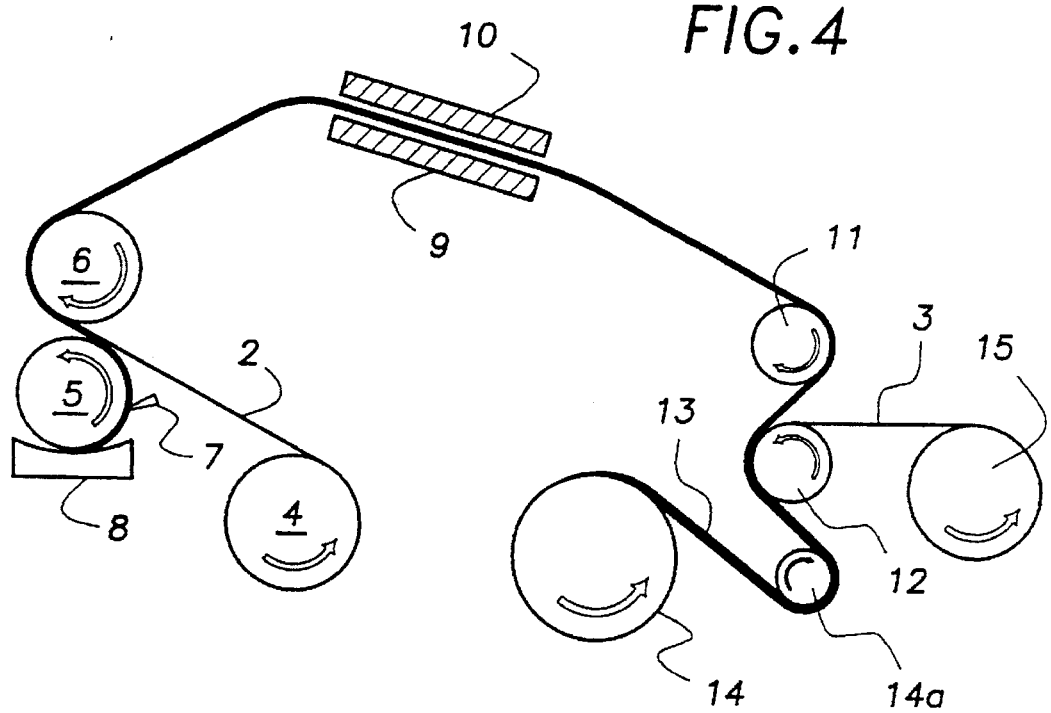
FIG. 4 is a drawing of a schematic process for the lamination of a prior art polymeric substrate containing a holographic image to a paper tissue substrate.

FIG. 4 is a schematic drawing representing a novel process of this invention for the transfer of a holographic image from a polymeric substrate to a paper tissue substrate.

In this figure, a holographic image 1 on a polymeric substrate 2 is shown being pulled off an unwind roll 4 in a nip formed by opposing rollers 5 and 6. In this view, roll 5 is a standard gravure coating roll and roll 6 is a backup roll. A reverse gravure doctor blade (to control coating weight) is shown as 7 and a coating pan (holding a standard adhesive solution) is shown as 8. The coated holographic image on a polymeric substrate is then carried through a drier which is indicated as 9 and 10 and subsequently down to heated rolls 11 and 12. In the nip formed by these last two rolls, a paper tissue substrate 3 taken from a roll 14 contacts the surface of the adhesive containing side of the dried, holographic image 1 contained on a polymeric substrate 2 and is laminated thereto. The heated rolls activate the dried adhesive in order to permit such a lamination to occur. The resulting sandwich 13 is passed over a chill roll 14a and then taken up by rewind roll 14.

Figure 5:
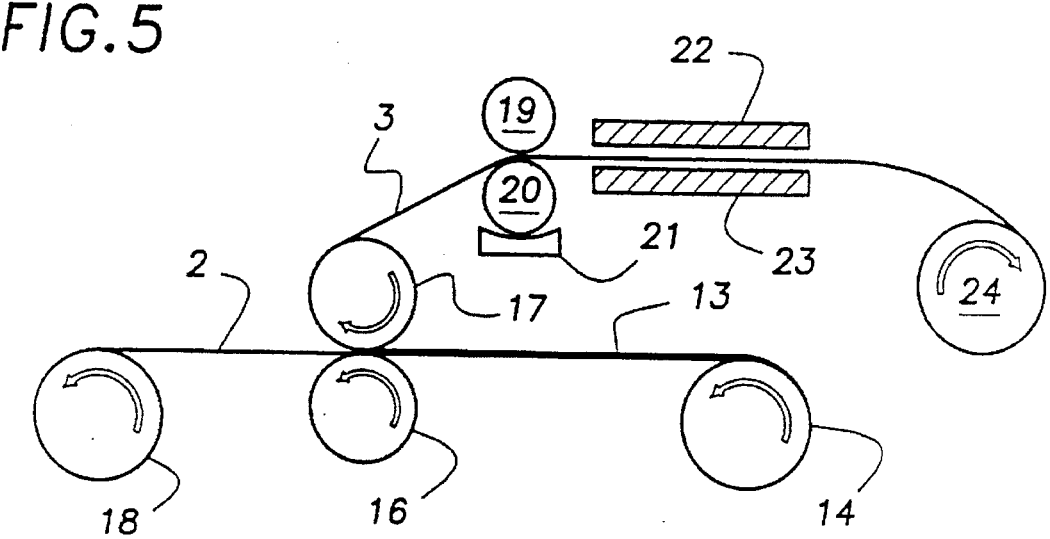
FIG. 5 is a drawing of a schematic process of direct delamination of the polymeric substrate from the paper tissue substrate to produce the holographic image of FIG. 2 directly on the paper tissue substrate.

The process of delamination is shown in FIG. 5. In this schematic drawing, the laminated sandwich material 13 is drawn off unwind roll 14 and taken through the nip of two delamination rolls 16 and 17. The polymeric substrate 2 is then taken up on a film rewind roll 18 (this material can subsequently be reused and recycled). The paper tissue substrate 3 now carrying the holographic image 1 (not shown in this figure) thereon is taken up to coating heads 19 and 20. A protective layer is applied over the holographic image contained on this paper tissue substrate in order to protect this image during handling. This may be applied at the nip of the coating heads and a pan 21 is graphically shown in this view. The holographic image on the paper tissue substrate is then carried into another drier to insure that the protective coating is hardened prior to be rolled up on to a final roll 24. The roll of holographically imaged paper tissue is now ready for use as a wrap for food products and the like.

Figure 6:
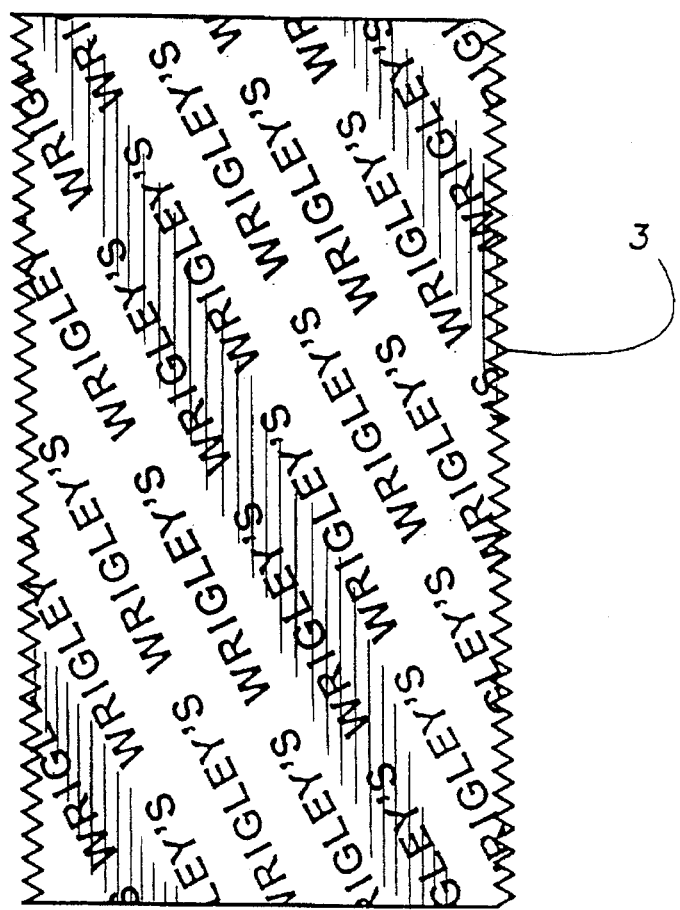
FIG. 6 is a top view of a drawing showing a name brand as a holographic image on a paper tissue substrate, said holographic image having been transferred from a polymeric substrate. A series of these images may be prepared and rolled up so that this holographic image can be used to wrap and advertise in a flashy method.

In FIG. 6, a top view of a typical paper tissue substrate 3 having a name brand applied in a holographic image is shown. This holographic image (seen here as "Wrigleys") was originally manufactured on a polymeric substrate in a conventional manner and then transferred to the paper tissue substrate 3 in a manner described in FIGS. 4 and 5. This permits the wide-spread use of a holographic advertisement on a product such as a stick of gum. The holographic image, transferred to the paper tissue substrate, is flashy and eye catching and this is the first such use thereof.

Although a temperature greater than 25° C. can be used, I prefer temperatures of 30 to 125 degrees and more preferably at temperatures of between 60 to 90 degrees at the nip of the lamination process of this invention. At the same time, an elevated pressure is applied to the nip to cause the two substrates, with the holographic image sandwiched between, to be laminated together. A pressure greater than 1 pound per square inch and up to 1,000 pounds per square inch may be used, although I prefer 5 to 10 pounds per square inch.

It is most important that the temperature of any step of this process not be greater than 150° C. in order not to harm or deform the holographic images in any way. Looking again at FIG. 4, the conditions in the drier should be such that the surface of the polymeric substrate 2 carrying the holographic image 1 and a layer of adhesive material, be somewhere between 25 and 150 degrees centigrade and most preferably 60 to 90 degrees centigrade. One can design a drier which has a proper length and can emanate the proper degree of heat to match up with the web speed which is passing through this drier. The heated nip also should have a temperature of between 25 and 150 degrees C. The purpose of the chill roll 14a is to set up the adhesive and insure that the paper tissue substrate 3 and holographic image 1 on the polymeric substrate 2 is secured. The adhesive material is well-known in the coating art and can be applied at a coating weight of between 0.5 to 8 pounds (dry) per ream of paper, wherein a ream is 500 sheets of paper of 24 inches by 36 inches in size, and can be applied either to the paper tissue substrate or to the holographic image layer. Within the drawings which make up some of the best modes as envisioned at the time of filing of this invention, the adhesive layer is shown being applied to the holographic image first. Then, the paper tissue substrate contacts this layer at the heated nip rolls and is adhered thereto.

The protective layer that is applied over the top of the holographic image that has been transferred to the paper tissue substrate by delamination, as shown in FIG. 5, can be any of a host of conventional materials such as solvent or water based acrylics, for example. This protective layer may be colored or tinted to provide requisite color matching to colored paper tissue layers, for example.

I can use a host of paper tissue substrates within the metes and bounds of this invention. For example, if one wishes to have holographically enhanced wrapping paper tissue for a host of applications, regular wrapping paper tissue may be used within the ambit of this invention. By wrapping paper tissue I mean that which is said to have 5 to 24 pounds per ream, where a ream is 500 sheets of paper tissue of 24 inches by 36 inches in size. This paper tissue is particularly useful since it has such low weight and thus can be used to wrap up small items such as a stick of gum, for example.

The conventionally holographically imaged polymeric substrates include many of the commonly available plastics, for example. These will include polyethylenes, polypropylenes, polyethylene terephthalates, among others, for example. These substrates are usually 0.03 to 4.0 mils in thickness.

The paper tissue substrates on which the holographic images have been transferred may be used in a host of applications including the wrapping of candies and gums; gifts; store wrappings; decorative wrappings; etc. The holographic image may be altered for the use desired. Advertising and decorative images are also envisioned within this invention. Such applications will find wide use within the various industries that employ wrappings of this sort.

The ability to dry-bond laminate and then to delaminate the elements described within this invention represents a unique process since it was not widely known that holographic images could be so transferred. The process as described above uses some unique equipment that is designed to hold, laminate and then delaminate some fairly flimsy material. It is necessary to insure that all of the elements of the process are carefully maintained within processing limits. The use of elements produced within the scope of this invention greatly increases the utility of holographic images within a broader scope. This means that holographic images with larger images, images that can utilize advertising and logos and the like, are now possible.

I claim:

1. A holographically enhanced tissue paper wrapping element comprising a tissue paper substrate having at two, flat surfaces, wherein said holographic enhancement is achieved by laminating at a temperature of between 25° C. and 150° C. and a pressure of greater than 1 pound per square inch a holographic image contained on a polymeric substrate to one of said surfaces of said tissue paper substrate and subsequently delaminating said paper tissue substrate from said polymeric substrate whereby said holographic image is transferred to said paper tissue substrate.

2. The element of claim 1 wherein said temperature is between 30° and 150° C. and said pressure is between 1 and 1,000 pounds per square inch.

3. The element of claim 1 wherein said temperature is between 60° and 90° C. and said pressure is between 5 to 10 pounds per square inch.

4. The element of claim 3 wherein said holographically enhanced tissue paper wrapping element is a food wrapping element.

5. The holographically enhanced tissue paper wrapping element of claim 3 wherein said holographic enhancement is a logo.

6. The holographic tissue paper wrapping element of claim 1 wherein said element is used to wrap a gift and said element is colored.

7. The element of claim 1 wherein said tissue paper substrate has a weight between 5 and 24 pounds per ream, wherein said ream is 500 sheets of 24 by 36 inch paper.

* * * * *